United States Patent [19]
Kidd

[11] 4,129,333
[45] Dec. 12, 1978

[54] TIP-UP VEHICLES

[76] Inventor: Archibald W. Kidd, Seend Close Seend, Melksham, Wiltshire, England

[21] Appl. No.: 650,608

[22] Filed: Jan. 20, 1976

[30] Foreign Application Priority Data

Jan. 29, 1975 [GB] United Kingdom ............... 3999/75

[51] Int. Cl.$^2$ ............................................. B60P 1/04
[52] U.S. Cl. ............................ 298/22 R; 92/130 A; 214/142; 214/501; 298/10
[58] Field of Search ............. 298/22 R, 22 AE, 22 C, 298/22 B, 22 F, 22 D, 22 J, 22 P, 10; 214/501, 142, 127; 92/130 A, 134

[56] References Cited

U.S. PATENT DOCUMENTS

| | | | |
|---|---|---|---|
| 2,631,888 | 3/1953 | De Hart | 298/22 R |
| 3,456,823 | 7/1969 | Martelee | 214/1 Q X |
| 3,667,621 | 6/1972 | Barlow | 214/142 X |
| 3,850,473 | 11/1974 | Huber | 214/140 X |

FOREIGN PATENT DOCUMENTS

| | | | |
|---|---|---|---|
| 250611 | 12/1962 | Australia | 298/22 R |
| 110301 | 3/1964 | Czechoslovakia | 298/22 R |
| 1807788 | 2/1971 | Fed. Rep. of Germany | 92/134 |
| 1041609 | 10/1953 | France | 298/22 C |
| 332495 | 7/1930 | United Kingdom | 298/22 R |
| 241241 | 9/1969 | U.S.S.R. | 92/134 |

Primary Examiner—Frank E. Werner
Attorney, Agent, or Firm—Larson, Taylor & Hinds

[57] ABSTRACT

A tip-up trailer with a hydraulically operated tipping body having a device for preventing the tipping body sticking up in the raised position. This is done by providing a back pressure to bear on the piston of a hydraulically operated ram to assist in the commencement of the lowering operation. Preferably this back pressure is provided in the ram which raises and lowers the tipping body.

6 Claims, 1 Drawing Figure

U.S. Patent
Dec. 12, 1978
4,129,333
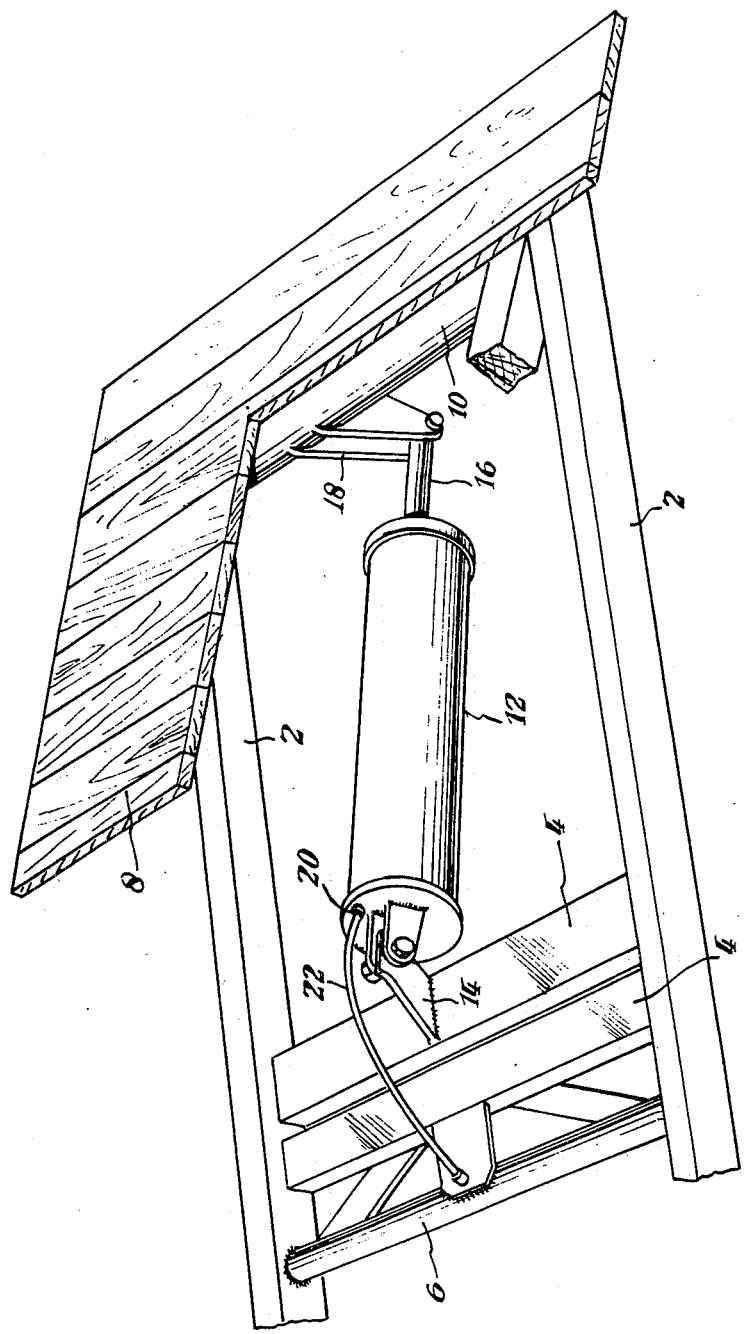

TIP-UP VEHICLES

FIELD OF THE INVENTION

This invention relates to tip-up vehicles, particularly farm trailers, lorries and the like, hereinafter referred to as trailers.

BACKGROUND AND SUMMARY OF THE INVENTION

Many trailers do not tip up to a high enough angle for easy discharge of sticky materials such as wet clay. It is, however, possible to arrange for a trailer to tip up to a very high angle, say 80° to 85° from horizontal, and one way of doing this is described in my copending application Ser. No. 522,218, now U.S. Pat. No. 3,963,274, although other ways may be adopted. However, when the trailer is tipped to such a high angle, there is a possibility that it may not readily come down again on the conclusion of the tipping operation because the weight of the trailer body tends to come behind the vertical line through the hinge point of the body and the trailer may be in a situation such that it is just beginning to overbalance backwards.

The object of this invention is to provide means whereby the trailer will come back more readily to its normal horizontal position.

According to this invention there is provided a tip-up trailer having a hydraulic cylinder the interior of which is divided into two compartments by a piston working therein to operate a ram, the first compartment on one side of the piston being filled with fluid to operate the ram, the second compartment on the other side of the piston being closed to the atmosphere and containing a quantity of air or other gas which is compressed and expanded with the movement of the piston. The Second compartment may be connected to a closed storage chamber also filled with air or gas.

BRIEF DESCRIPTION OF THE DRAWINGS

One form of tip-up trailer made according to the invention is illustrated in the accompanying drawing which is a perspective view of the trailer with the trailer body in the partly raised position.

DESCRIPTION OF PREFERRED EMBODIMENTS

Referring to the drawing the chassis of the tip-up trailer comprises two elongate frame members 2 with cross bars 4 and a hollow tubular member 6 spanning between the members 2. The floor 8 of the tip-up body is fixed at the rear end to a transverse tubular member 10 which is rotatable to raise the floor 8 into the tip-up position as described in my co-pending application No. 522218 now U.S. Pat. No. 3,963,274.

A hydraulic cylinder 12 is mounted on the chassis of the trailer by a bracket 14 fixed to one of the cross bars 4. A piston in the cylinder 12 operates a ram 16 to rotate the tubular member 10 through a bracket 18. The piston divides the interior of the cylinder 12 into two compartments. The first or rear compartment on the right of the drawing is filled with oil or other fluid to operate the ram 16 and the second or front compartment on the left of the drawing is filled with air and, instead of having a vent open to the atmosphere has an outlet 20 connected to the tubular member 6 through a flexible tube 22. The tubular member 6 also filled with air acts as a storage chamber for the air trapped in the front compartment. Instead of air other compressible fluids can be used.

In use, when the body is to be raised to discharge a load, the ram 16 rotates the transverse member 10 and the body moves into a nearly vertical position.

By choosing a storage vessel of appropriate small size such as a fairly small tubular chassis member 6 as described, it will be seen that as the ram 16 expels air during tipping from the front compartment to the member 6 a back-pressure will build up to possibly 200–500 p.s.i. so that when the tipping body is at its maximum height there is a useful back-pressure on the hydraulic ram 16. This back-pressure can be arranged to be sufficient to ensure that the body promptly begins to come down when it is decided to lower it. In other words, the air is used as a return spring. In this way very high tipping angles can be successfully employed without the risk of the tipping body sticking up.

An alternative to the above construction is to enlarge the size of the second or front compartment so as to provide an appropriate amount of clearance volume on this side of the piston in the hydraulic cylinder so that when the body is fully raised and the piston is consequently at the end of its stroke, the air would be compressed to a sufficient pressure in the second compartment to act as a spring for returning the body into the lowered position.

It is therefore purely a matter of economics to decide between the two methods proposed. There is however an advantage to be achieved by the first method, namely that if there is a translucent part of the pipe leading to the storage reservoir it can then be seen whether hydraulic oil is leaking past the piston since such leakage oil will be impelled along the pipe in the act of raising the tipping body and it will be possible to see this visually. With the second construction, any leakage past the piston seals could not be readily detected.

An added advantage of not allowing the air from the front compartment of the cylinder to escape to the atmosphere but to contain it, is that however many times the trailer is tipped and lowered the same charge of air is retained and passes into and out of the cylinder without becoming contaminated with dirt and damp. This prevents corrosion or pollution of the smooth inside surface of the ram cylinder and tends to give a longer life to the ram seals.

I claim:

1. Tip-up dumping trailer having a chassis, a tipping body, a ram for raising and lowering said body, a pivotally mounted hydraulic cylinder the interior of which is divided into first and second compartments by a piston working therein and coupled to operate the ram, the first compartment on one side of the piston being filled with fluid to act directly on the piston to operate the ram in the body raising direction, the second compartment on the other side of the piston being closed to the atmosphere and containing a quantity of air or other gas which is continuously compressed and expanded by the piston throughout the movement of the piston and the attendant movement of the tipping body, and provides a pneumatic force to act directly on the piston to assist the lowering of said body.

2. Tip-up trailer according to claim 1 wherein the second compartment is connected to a closed storage chamber also containing air or other gas.

3. Tip-up trailer according to claim 2 wherein the second compartment and closed chamber are connected by a flexible tube.

4. Tip-up trailer according to claim 2 wherein the said closed storage chamber is a hollow structural member of the trailer chassis.

5. Tip-up trailer according to claim 2 wherein the said closed storage chamber is a cylinder extending transversely across the trailer chassis.

6. Tip-up trailer according to claim 1 wherein the tipping body is mounted on a rotatable transverse member at the rear end of the trailer chassis, the hydraulic cylinder being mounted lengthwise of the chassis and the ram rotating the said transverse member to raise and lower the said body.

* * * * *